United States Patent [19]

Perl

[11] 4,102,496
[45] Jul. 25, 1978

[54] THERMAL VALVE

[75] Inventor: Richard L. Perl, Mansfield, Ohio

[73] Assignee: The Tappan Company, Mansfield, Ohio

[21] Appl. No.: 653,477

[22] Filed: Jan. 29, 1976

[51] Int. Cl.² .................. F16K 31/56; F16K 31/04
[52] U.S. Cl. ........................ 236/48 R; 236/101 E; 236/DIG. 21; 251/11; 251/75
[58] Field of Search .................. 251/11, 360, 75, 285; 236/48 R, 101 E, DIG. 21

[56] References Cited

U.S. PATENT DOCUMENTS

| 1,643,255 | 9/1927 | O'Dowd | 236/48 R |
| 2,783,946 | 3/1957 | Lansky et al. | 236/48 R |
| 3,086,746 | 4/1963 | Holleron | 251/303 X |
| 3,229,956 | 1/1966 | White | 236/48 R |
| 3,330,479 | 7/1967 | Vollprecht | 236/48 R |
| 3,955,791 | 5/1976 | Meckstroth | 251/75 X |

Primary Examiner—Arnold Rosenthal

Attorney, Agent, or Firm—Maky, Renner, Otto & Boisselle

[57] ABSTRACT

An electro-thermal gas valve uses a mechanical energy storage device, preferably a C-spring or a coil spring, to effect a snap opening and closing of a poppet in response to the position of a heat warpable bimetal member and, therefore, is relatively insensitive to gas pressure in the valve enclosure. Application of heat to the bimetal member causes relative movement of the opposite ends of the energy storage device to effect overcenter travel of one end relative to the other end, whereupon the stored potential energy in the energy storage device is released as kinetic energy to snap the poppet open or closed. The valve is adjustable and due to its relative insensitivity to pressure in fact may be calibrated before the valve container and cover are assembled. A stop mechanism may be provided to assume affirmative support of the energy storage device whether the valve is open or closed, and a light bias spring may be utilized to help maintain the poppet closed until snapped open.

8 Claims, 13 Drawing Figures

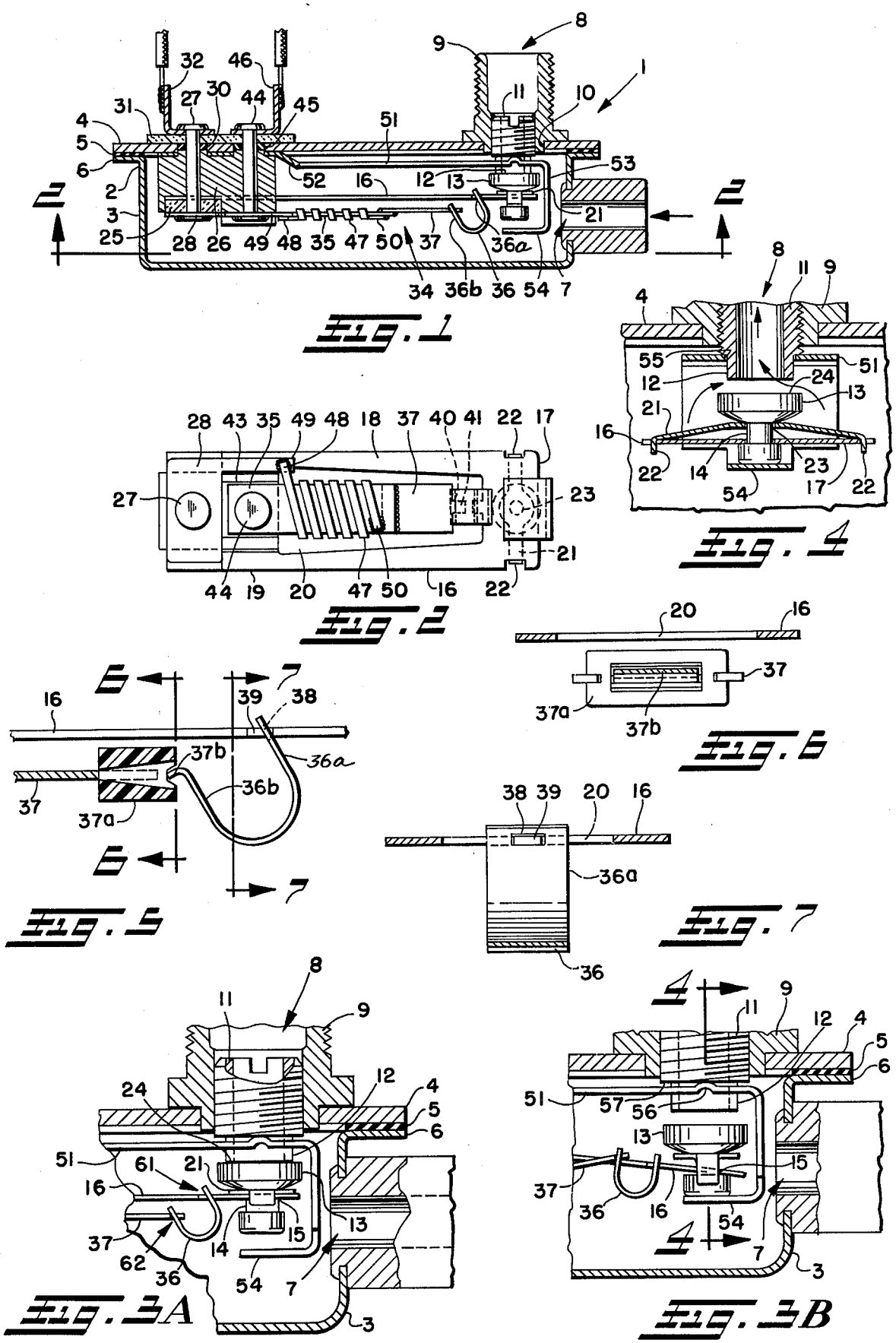

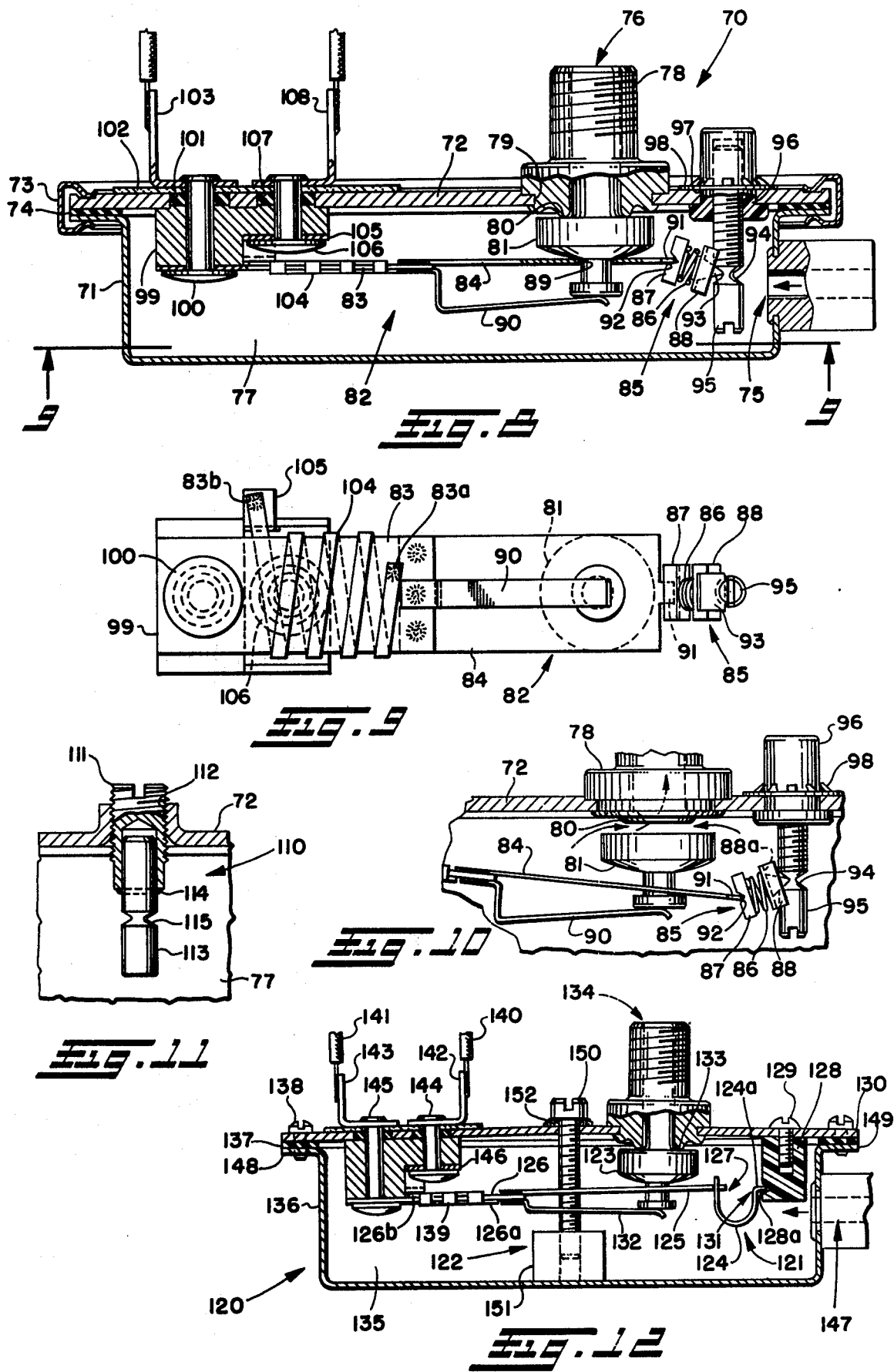

THERMAL VALVE

BACKGROUND OF THE INVENTION

The present invention relates to fluid valves and, more particularly, to a thermal fuel valve that undergoes a snap action upon opening or closing.

One type of thermal fuel valve is disclosed in U.S. Pat. No. 3,870,457, issued Mar. 11, 1975. Such a thermal fuel valve includes a container having an inlet and an outlet and a poppet that is moved by a heat warpable member between open and closed positions with respect to the outlet. As disclosed in the mentioned patent, the thermal fuel valve, for example, may be used with an electric igniter device in a gas range appliance or the like in order to control gas flow while the igniter provides automatic gas ignition at a gas burner without the need for a continuously burning, fuel wasting pilot light, thereby saving substantial amounts of fuel when the appliance is not in use. The electric igniter, which is positioned proximate a burner of such an appliance, and an electric heater, which is positioned in the thermal fuel valve to heat the heat warpable member therein, are desirably connected for series electric energization so that the thermal fuel valve will open and allow gas to flow to the burner only when the electric igniter has been energized and has achieved a suitable gas ignition temperature. The valve of such aforementioned U.S. patent also has provision for calibration to coordinate opening of the valve with the igniter temperature.

Since an appliance incorporating such a thermal fuel valve arrangement, as disclosed, for example, in the mentioned patent, does not experience any fuel flow in the fuel circuit between the appliance fuel input connection and the burner unless the thermal fuel valve is open, the pressure regulator in that fuel circuit which is usually located between the fuel input connection and the thermal fuel valve, may not operate properly to regulate the fuel pressure. While a satisfactory fuel flow to the pilot light in prior art ranges will maintain the pressure regulator operable, complete closure of fuel flow in ranges or the like in which no pilot lights are used may cause a relatively high pressure at the fuel valve under a no flow condition, which may impede valve opening.

SUMMARY OF THE INVENTION

The thermal fuel valve of the present invention utilizes a mechanical energy storage device, which preferably is a C-spring or coil spring or the like, to effect a snap action in moving the valve poppet to its open or closed positions and to effect valve opening and closing with relative insensitivity to pressure in the valve. The opposite ends of the mechanical energy storage device act as pivots, at least one of which is movable in response to movement of a heat responsive member, such as a bimetal element, to cause the device to assume a different one of two stable conditions each time one of its pivots moves over-center relative to the other.

By utilizing the energy stored in the mechanical energy storage device particularly to open the poppet of a fluid valve, while the bimetal element heated by the valve heater only works against a relatively known opposing force of the storage device, the required energy input to the valve heater to open the valve will remain relatively constant over a wide range of fluid pressures in the valve. Additionally, the relatively rapid or snap action opening and closing of the valve poppet by the released storage device assures positive opening and closing of the valve, speeds up the stabilizing operation of the pressure regulator, and reduces the possibility of a flashback.

The valve is conveniently adjustable from the exterior thereof, for example, for calibration purposes in simulated or actual operating conditions, to effect an adjustment of the normal pre-load force that tends to urge the poppet of a deenergized valve to a closed position. Moreover, due to its relative insensitivity to pressure, the valve may be calibrated before the enclosure container and top are assembled. A stop mechanism in the valve enclosure may be provided to limit the maximum opening travel of the poppet relative to the valve seat at the valve outlet for standardization and to assure that support of the storage device is maintained, and a light force spring may also be used to assure poppet-seat contact while the valve is closed and until an affirmative opening is effected.

Accordingly, it is a primary object of the invention to provide a fluid valve improved in the noted respects.

Another object of the invention is to effect a snap action in the opening and closing of a thermal fuel valve.

An additional object of the invention is to provide a facile adjustment or calibration capability for a thermal valve.

A further object of the invention is to provide for calibration of a thermal valve, particularly a thermal fuel valve, before assembly of the valve enclosure container and top.

Still another object of the invention is to effect opening and closing of a fluid valve, and particularly a thermal fuel valve, with relative insensitivity to pressure over a relatively wide range of internal valve pressures.

Still an additional object of the invention is to maintain constant the poppet-valve seat open clearance for a fluid valve having an adjustable valve seat.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is an elevation view, partially in section, of a fluid valve in accordance with the invention;

FIG. 2 is a bottom view of a portion of the valve looking in the direction of the arrows 2—2 of FIG. 1;

FIGS. 3A and 3B are enlarged partial elevation views, partly in section, of the valve of FIG. 1 proximate the valve inlet and outlet showing the valve closed and open, respectively;

FIG. 4 is a partial section view of an energized open valve outlet looking generally in the direction of arrows 4—4 of FIG. 3B;

FIG. 5 is a partial view, partly in section, of a modified C-spring connection;

FIGS. 6 and 7 are section views of the C-spring connections looking, respectively, in the directions of the arrows 6—6 and 7—7 of FIG. 5;

FIG. 8 is an elevation view partly in section, of a modified fluid valve in accordance with the invention;

FIG. 9 is a bottom view of a portion of the modified valve looking in the direction of the arrows 9—9 of FIG. 8;

FIG. 10 is a partial view similar to FIG. 8 but showing the valve in open condition;

FIG. 11 is a partial elevation view, partly in section, of a modified valve adjustment mechanism; and FIG. 12 is an elevation view, partly in section, of a further modified fluid valve in accordance with the invention.

DESCRIPTION OF THE PREFERRED EMBODIMENTS

Referring now more particularly to the drawings and initially to FIGS. 1 through 7 wherein like reference numerals designate like parts in the several figures, the fluid valve of the invention is generally designated at 1 in FIG. 1. It will be appreciated that although the fluid valve of the invention is described herein with reference to use as a thermal fuel valve to control gaseous fuel flow to a gas burner in a gas range appliance in conjunction with an electric igniter, for example, coupled in a valve and igniter system disclosed in the above-mentioned patent, the fluid valve 1 may be employed in other applications to control the flow of combustible fluids or non-combustible fluids.

The thermal valve 1 includes a fluid-tight enclosure 2 formed by a container 3 to which a top 4 is secured by suitable fastening means, not shown. A gasket 5 between a peripheral flange 6 of the container 3 and the top 4 may be used to enhance the fluid-tight integrity of the enclosure 2.

A fluid inlet 7 provides an entrance to the enclosure 2 for gas supplied to the appliance fuel circuit, which may include a conventional pressure regulator, from a supply, not shown.

The thermal valve 1 also has a fluid outlet 8 for coupling fuel, or other fluid, as the case may be, from the enclosure 2 to the relative downstream portions of the appliance fuel circuit, including, for example, the burner. The fluid outlet 8 may include an outlet fitting 9 secured to the top 4 in an opening 10 therethrough, as by brazing or staking the same to the top 4, and an adhesive sealant material also may be applied between confronting surfaces of the fitting 9 and top 4 to maintain the fluid-tight integrity of the enclosure 2. Within a longitudinally central portion of the fitting 9 is an adjustable valve seat member 11, which may have a necked down or reduced cross-section end forming a valve seat 12 against which the valve closure element or poppet 13 may bear to close the thermal valve 1 preventing fluid flow through the fluid outlet 8. Vertical adjustment of the valve seat 12 relative to the top 4 may be accomplished, for example, by providing a threaded connection therebetween, whereby rotation of the valve seat will cause the valve seat to be raised or lowered with respect to the top 4 so as to vary the normal preload closure force of the poppet 13 against the valve seat and/or to vary the normal closed relative positions of the energy storage device, as will be described in more detail below. This type of adjustment arrangement permits valve calibration both during manufacturing, for example, before the container 3 and top 4 are assembled, and at the time of valve installation, for example, in an appliance, or thereafter. After calibration of the valve 1 it may be desired to secure the valve seat member 11 in permanent position using, for example, an anaerobic epoxy or the like.

A narrow neck 14 of the poppet 13, as is clearly shown in FIG. 3, fits through a hole 15 in a flexible or resilient holder support 16, which is shown in a plan view in FIG. 2 including a poppet holding portion 17, a connecting portion 18, and a mounting portion 19, all of which circumscribe a central open area 20 in the holder 16. A relatively light force spring 21, illustrated more clearly in FIG. 4, positioned by the tabs 22 on the poppet holding portion 17, has a centrally located hole 23 through which the poppet neck 14 fits, and the spring 21 normally tends to urge the large seating portion 24 of the poppet away from the holder 16 and toward the valve seat 12. The mounting portion 19 of the holder 16 is held in place by but electrically insulated from an electrically conductive metal rivet 27 passing therethrough, such rivet being electrically connected to a metal terminal plate 28 therebeneath and to an electrical terminal 32 outside the enclosure 2, with suitable insulating blocks or strips 25, 26 and 31 separating the various parts and electrically insulating such parts from the top 4 to which they are secured by the rivet passing therethrough and through an opening in the top 4 sealed by an O-ring or the like 30. The hole 15 in the poppet holding portion 17 is positioned directly beneath the valve seat 12 in order to align the poppet 13 directly with the valve seat to close the same.

The holder 16 normally extends in a linear direction, as shown in FIG. 1, and together with the spring 21, normally urges the valve seating portion 24 toward the valve seat 12. Moreover, the configuration of the poppet 13 is such that when it is closed against the valve seat 12 fuel pressure in the enclosure 2 will further urge the poppet against the valve seat ensuring closure of the thermal valve 1. When the valve is closed, the spring 21 will usually be flattened, as shown in FIGS. 1 and 3A.

The holder 16 and the poppet 13 are moved in the enclosure 2 by a valve actuator 34, which includes a thermally responsive warpable member 35, such as a conventional bimetal element, and a mechanical energy storage device 36, such as a C-spring or other type spring or the like. The two opposite arms 36a, 36b of the C-spring 36 are preferably preloaded or compressed toward each other, i.e. relative to the wider displaced respective positions they would assume if the C-spring were in a free or neutral state, between the poppet holding portion 17 of the holder 16 and an extension 37 of the bimetal element 35. Preferably the C-spring arm 36a has a small opening 38 therein through which a tab 39 of the holder 16 extends to lock that arm to the holder in the manner illustrated in FIG. 7. The other arm 36b has a similar hole 40, see FIG. 2, into which fits a tab 41 on the end of the extension 37, which may be a temperature compensator bimetal element. The compensator extension may be welded or otherwise secured to an end of the bimetal element 35 and may be selected in conventional manner to obtain a desired response of the actuator 34. The bimetal element 35 is aligned beneath the area 20 circumscribed in the holder 16 and an end thereof is received in a pocket 43 in the ceramic block 26 and secured to the top 4 of the enclosure 2 by an electrically conductive metal rivet 44 that passes through the ceramic block 26, another sealed opening in the top 4 sealed by an O-ring 45, and the mica board plate 31 to bear against another electrical terminal 46 outside the enclosure. The rivet 44 is thus electrically connected to both the electrically conductive bimetal element 35 and to the terminal 46, while being electrically insulated from the top 4.

It will be appreciated that while a preferred form of the invention utilizes such an extension 37 to couple the bimetal element 35 to the arm 36b of the C-spring 36, the C-spring also may be directly connected to an end portion of the bimetal element 35 or to another form of extension thereof, depending, for example, on the operating characteristics of the bimetal element 35, keeping in mind that, as will be described further below, the arm 36b of the C-spring is to be moved relative to the arm 36a in response to movement of the bimetal element 35. For example, as illustrated in FIGS. 5 and 6, the extension 37 includes an electrical insulator termination 37a, and a bent over end 37b of the C-spring arm 36b is secured in a slot in the insulator 37a.

In order to effect movement of the bimetal element 35 in the enclosure 2 an electrically insulated electric heater wire 47 is wrapped around the bimetal element 35 to heat the same upon receiving an electrical input. One end 48 of the electric heater 47 may be welded to a terminal tab 49 of the electrically conductive metal terminal plate 28, which forms part of an electrically conductive path including the electrically conductive rivet 27 to the electrical terminal 32, as shown in FIGS. 1 and 2. The other end 50 of the electric heater is preferably welded to the electrically conductive bimetal element 35 as shown in FIG. 2, which also forms part of an electrically conductive path including the electrically conductive rivet 44 to the electrical terminal 46. The electrical terminals 32 and 46 may be connected in a series electrical circuit with an electric igniter in the manner disclosed in the above-mentioned U.S. Pat. No. 3,870,457 so that both the electric heater 47 and the igniter, not shown, may be simultaneously energized and the valve will open when the igniter has attained fuel ignition temperature.

Moreover, while the C-spring 36 is preloaded, as described, preferably only to facilitate support thereof in the valve without wasting motion of the bimetal 35 during valve operation, it is contemplated that other equivalent support arrangements may be provided the C-spring maintaining the same in a neutral unloaded state when the valve is fully open or closed, preferably still without wasting motion of the bimetal. Of course, if a delayed valve response were desired, the C-spring may be placed under a relatively higher preload so that as the bimetal 35 is heated and initially tries to warp, that warping will be initially opposed, for example, by the preloaded C-spring or other energy storage device.

Also secured to the top 4 of the enclosure 2 between the ceramic block 26 and the interior surface of the top 4 is a spring-loaded stop member 51. The stop member has an elongated portion extending from an offset bend 52 toward the valve seat 12, and a movable end of the stop member 51 is bent down around the poppet 13 forming a surface area 53 facing the valve inlet 7 to provide a baffle effect and a stop surface 54 beneath the poppet 13 to limit the maximum travel of the poppet away from the valve seat when the valve is open. The offset bend 52 in the stop member 51 provides a resiliency in the elongated portion thereof tending to urge the same toward the top 4. The valve seat 12 extends through an opening 55 in the stop member 51, and a raised land 56 near the opening 55 normally under the resilient influence of the offset bend 52 abuts the transition surface 57 joining the larger and reduced cross-section portions of the valve seat member 11. Therefore, as the valve seat member 11 is raised or lowered, the stop surface 54 will be raised or lowered a corresponding amount to ensure that the maximum separation between the poppet seating portion 24 and the valve seat 12 will always be the same regardless of the valve calibration. Moreover, by limiting the maximum travel of the poppet 13 to its open position, the maximum travel of the holder 16 is also limited, and, therefore, the compression or preload of the C-spring 36 and, thus, its support within the valve will be maintained regardless of whether the thermal valve 1 is open or closed.

The C-spring 36 may be considered to have two opposed pivots or support points 61, 62, respectively, at the tab-in-hold connections thereof to the holder 16 and the compensator extension 37. When the thermal valve is de-energized, whereby no electric energy is supplied to the heater 47, the bimetal element 35 and the compensator extension assume the relatively straight elongated position illustrated in FIGS. 1 and 3A so that the pivot 61 is between the pivot 62 and the valve seat 12. Therefore, the mechanical energy stored in the C-spring 36 will push the holder 16 toward the valve seat 12 so that the seating portion 24 of the poppet seals closed against the valve seat.

To open the thermal valve 1 the heater 47 is energized by electric power supplied at the electrical terminals 32, 46, and as the bimetal element 35 is heated, it warps in a direction toward the top 4 working against only an opposing force exerted by the C-spring 36 and, thus, compressing the same to store potential energy therein or to increase its potential energy. As the bimetal element 35 continues to warp toward the top 4, the pivot 62 moves past a center position in the plane of the holder 16 in which the pivot 61 is located to an over-center position with respect to the pivot 61 whereby the latter will then be between the pivot 62 and the stop surface 54. As the pivot point 62 passes its over-center position, the energy stored in the C-spring 36 forces the holder 16 away from the top 4, and the seating portion 24 of the poppet 13 is then snapped away from the valve seat 12 until the poppet engages the stop surface 54, as in FIGS. 3B and 4. During this opening action of the thermal valve 1, the relatively light force spring 21 holds the seating portion 24 of the poppet 13 closed against the valve seat until the pivot 62 of the C-spring 36 clearly moves to an over-center position with respect to the pivot 61 to effect the described snap action. Thus, the spring 21 prevents the poppet from creeping away from the valve seat as the pivot 62 passes through the center position and additionally prevents possible drag on the poppet neck or stem 14 that might wear the same.

A snap action closure of the thermal valve 1 occurs in a similar manner as the electric power to the heater 47 is terminated allowing the bimetal element 35 to cool. Then, again working against only the opposing force of the C-spring 36, the bimetal element 35 moves the pivot 62 toward the opposite over-center stable position relative to the pivot 61 compressing the C-spring to store potential energy therein; and as that over-center relation is reached, the stored energy is released and the C-spring snaps the holder 16 and poppet 13 back toward the valve seat 12 to close the valve.

In calibrating the thermal valve 1 the predetermined temperature of the heater 47 and the bimetal element 35 and the time required for that predetermined temperature to be achieved, may be adjusted quite simply by an inward or outward movement of the calibrating adjustment mechanism which comprises the valve seat member 11. Such adjustment varies the relative positions of the pivots 61, 62 and, thus, the normal closing force applied thereby to the poppet as well as the amount of travel required of the bimetal element 35 to move the pivot 62 over-center with respect to the pivot 61.

Since the bimetal element 35 works against only the opposing force of the C-spring 36 and is not responsive to changing forces on the poppet 13 corresponding to changing pressures in the enclosure 2, the only affect of varying internal valve pressures on the valve operation is in respect to corresponding thermal transmission effects on the bimetal element 35, and these are relatively insignificant, especially over a preferred pressure range of about four inches to about twenty inches of water. Being so relatively insensitive to pressure over a relatively wide range, the valve will not open prematurely under reduced pressure or fail to open under increased pressure. Moreover, since the thermal valve 1 is not susceptible to varying pressure in the enclosure 2, the calibration adjustment may be made and pre-set before the container 3 is secured to the top 4.

The size of the C-spring 36 and the mechanical energy normally stored therein during valve opening and closing operation are preferably sufficiently large to ensure snap action opening and closing of the poppet 13 over a relatively wide range of pressures in the enclosure 2, such pressure, for example, tending to act on a closed poppet to maintain the same in closed position. Accordingly, once the thermal valve 1 has been calibrated or adjusted to open when the heater 47 and the bimetal element 35 have achieved a prescribed temperature, the thermal valve 1 then will open when that temperature is achieved even though the fuel pressure in the enclosure 2 may range from about 4 inches of water to about 20 inches of water. Moreover, by effecting such snap opening and snap closing of the thermal fuel valve 1, the pressure regulator upstream of the thermal fuel valve in the fuel circuit of an appliance will commence suitable fuel pressure regulation relatively promptly after the valve is opened, and the possibility of encountering flashback is reduced.

Turning now to FIGS. 8, 9 and 10, a modified fluid valve generally indicated at 70 includes an enclosure formed by a container 71 and a top 72 secured thereto, for example, by several spring clips 73 or the like. A silicone or other gasket 74 may be provided about the periphery of the valve enclosure at the juncture of the container 71 and top 72, and this gasket preferably is formed of room temperature vulcanizing material (RTV) that cements the container and top together while also sealing the same. Except for a fluid inlet 75 and a fluid outlet 76, the hollow interior 77 of the enclosure normally is maintained in fluid-tight condition. The valve outlet 76, which comprises a threaded fitting 78 that passes through an opening 79 in the top 72 and preferably is brazed or staked to the latter, has a valve seat portion 80 cooperable with the valve poppet or valve element 81 in the usual manner to close the valve preventing fluid from delivery to a downstream device, such as an appliance or the like.

The valve actuator 82 for effecting movement of the poppet 81 with respect to the valve seat 80 to open and to close the valve 70 includes, as before, a heat warpable member 83, such as a bimetal element, an extension 84 welded thereto and preferably being a bimetal compensator, and a mechanical energy storage device 85, here comprising a coil spring 86 with its opposed ends in abutting and/or other mechanical connection with holder plates 87, 88. The poppet 81 is mounted through an opening 89 in the extension 84, and a relatively light force spring 90 attached, for example, by welding, to the arm of the bimetal 83 and extension 84 urges the poppet toward the valve seat 80 generally in the manner and for the purposes described.

A tab 91 on the end of the extension 84 fits in a notch of groove 92 in the holder plate 87 to form one pivot or support point for the energy storage device 85, and a stub 93 on the other holder plate 88 rests within a V-shape annular groove 94 in a ceramic insert 95 to form the other relatively opposite pivot or support point for the energy storage device. The insert 95 is threaded into an insulator 96 that may be press fitted through an opening 97 in the top 72, sealed if necessary, and retained in position by a lock nut or lock washer type device 98. It will, of course, be clear that the relative spacing between the two pivot points and the amount of travel required of one with respect to the other to travel over the center position can be readily adjusted by screwing the ceramic insert 95 in or out of the insulator 96 when the container 71 and top 72 are disassembled, thus to effect calibration as described above. Moreover, as shown in FIG. 10, the holder plate 88 has a recessed portion 88a of a depth and configuration to engage the insert 95 when the energy storage device is in either of its two stable conditions, and the angle of and length of the stub 93, the angle and depth of the groove 94 and the recessed portion 88a thus determine particularly the normal maximum downward travel of the actuator 82 and the poppet 81. In a preferred form of the invention the angle of the groove 94 is about 60°. Since the valve 70 shown in FIGS. 8 through 10 is adjustable only from beneath the top 72, after assembly of the enclosure undesirable readjustment by an unqualified individual will be impossible without opening the enclosure.

The bimetal element 83 is mounted on an insulator 99 by an electrically conductive rivet 100 in electrical connection with the bimetal element. The rivet 100 passes through an opening in the top 72 sealed by an O-ring 101, through an insulator plate 102, and through an electrical terminal 103 for electrical and mechanical connection therewith. An insulated electric resistance heater 104, for example, of nichrome wire, wrapped around the bimetal element 83 is welded at one end 83a to the bimetal element and at the other end 83b to an electrically conductive plate 105, which is secured against the insulator 99 by another electrically conductive rivet 106. The rivet 106 is in electrical connection with the plate 105 and passes through an opening in the top 72 sealed by an O-ring 107, through the insulator plate 102, and through another electrical terminal 108 for electrical and mechanical connection therewith.

Whether the valve 70 is open or closed, there is normally a sufficient preload force applied to the spring 86 by the two holder plates 87, 88 and the extension 84 and ceramic insert 95 to maintain the mechanical energy storage device 85 supported in the valve capable of operation. Also, in the normal position of the valve actuator 82 shown in FIG. 8, the force of the spring 86, together with the force of the spring 90, normally urges the poppet 81 to the closed position against the valve seat 80. To open the valve, electric energy is supplied via the electrical terminals 103, 108, the rivets 100, 106, and the respective bimetal element 83 and plate 105 to the heater 104. Heat then generated by the heater warps the bimetal element 83 relative to its mounting structure, which comprises the elements 99 through 108, moving the pivot point at the holder plate 87 in a relatively downward direction compressing the spring 86 to increase its potential energy until the over-center position is reached, whereupon the spring releases its energy to snap down the actuator 82 and the poppet 81 opening the valve. The holder plate recess portion 88a ultimately engages the surface of the ceramic insert 95 while the bottom wall of the stub 93 engages the bottom wall of the groove 94 to provide a mechanical stop limiting the maximum opening of the valve, as is illustrated in FIG. 10. Closure of the valve will occur in a manner similar to that described above when the electric energy to the heater 104 is terminated.

Referring now to FIG. 11, a modified adjustment mechanism for the valve 70, for example, is illustrated generally at 110. This adjustment mechanism 110 includes an insert 111 in threaded engagement with the top 72 through an opening 112 in the latter, and a further insert 113 located within the hollow interior 77 of the valve cemented by epoxy or the like at 114 or otherwise fastened to the insert 111. The insert 113 includes a V-shape annular groove 115 having the same purpose and function as the V-shape annular groove 94 described above with reference to FIGS. 8 through 10. By rotating the insert 111 in the threaded opening 112 from above the exterior surface of the top 72, the relative location of the V-shape annular groove 115 in the enclosure interior 77 may be varied vertically in order to achieve the same effect as rotation of the insert 95 as previously described. After calibration has been effected, the insert 111 may be secured in permanent position using an epoxy or the like, as desired.

Turning to FIG. 12, a still further modified fluid valve 120, similar to the fluid valve 70 described above with reference to FIGS. 8, 9 and 10, is shown, with a principal difference being in the type of mechanical energy storage device 121 and calibration arrangement generally indicated at 122, respectively, to effect opening and closing of the valve poppet 123 according to the adjusted valve operating parameters. the mechanical energy storage device 121 comprises a C-spring 124 having one arm coupled to the end of the extension portion 125 of the heat warpable member 126, such as a bimetal element, to define a first pivot or support point 127 and its other off-set arm 124a fitted into s V-shape slot 128a in an insulator 128, which is secured by a screw or a rivet 129 to the valve top 130, so as to define a second pivot or support point 131. When the valve is closed the poppet 123 is urged by the spring 132 against the valve seat 133 of the valve outlet fitting 134. The bimetal element 126 may be mounted in the hollow interior 135 of the valve enclosure in the same manner as the element 83 of the FIGS. 8 through 10 embodiment. Likewise, the valve enclosure may be formed by the cover 130 and container 136 sealed and secured together, for example, by a silicone gasket 137 and screw fasteners 138, as previously described.

To open the valve, electric energy supplied to the opposite ends 126a, 126b of the valve electric heater 139 via the leads 140, 141, the terminals 142, 143, the rivets 144, 145, and the bimetal element 126 and the terminal plate 146, to which the ends are respectively welded, energizes the heater to heat the bimetal element, which bends in the downward direction moving the first pivot 127 below the second pivot 131, compressing the C-spring 124 during such action. Upon reaching its over-center position, the C-spring 124 snaps downward to draw the poppet 123 away from the valve seat 133 opening the valve and permitting gas from the valve inlet 147 to flow to the valve outlet 134. The maximum downward travel of the C-spring 124 and the rest of the actuator, which also includes the bimetal element 126 and the extension 125, is determined by the point at which the off-set arm 124a of the C-spring and the surface 128a of the insulator 128 interfere, that point also preferably being reached when the off-set arm rests flat against the bottom surface of the V-shape slot notch 128a. Upon discontinuing the electrical input to the heater 139, the bimetal element 126 cools and moves the first pivot 127 to the over-center position above the second pivot 131 whereupon the valve will snap closed in a similar manner.

In assembling the valve enclosure, the top 130 may be secured by the fasteners 138 to the container 136 in a manner such that the top 130 is slightly bowed upwardly, for example, to define an angle of approximately one or more degrees between the generally linear extent of the top commencing at one juncture to the container 136 and a line drawn between the opposed flanged edges 148, 149 of the container. Then by tightening or loosening a calibration screw 150, which is threaded in a block 151, for example, welded or otherwise secured to the valve container 136, the extent of the cover bow and the relative positions of the two pivot points of the C-spring 124 can be varied. After the screw 150 has been properly adjusted so the valve is calibrated to operate for opening under the desired conditions with respect to current flow through the heater 139 and the time at which high current flow occurs, for example, the screw 150 then may be secured against further adjustment by epoxy or the like, as indicated at 152.

Thus the several valve embodiments of the invention due to their relative insensitivity to internal operating pressure may be effectively calibrated before assembling the valve enclosure, and due to the snap opening and closing relatively prompt operation of the upstream pressure regulator is spurred and the possibility of encountering a flashback is reduced.

The embodiments of the invention in which an exclusive property or privilege is claimed are defined as follows:

1. A fluid valve, comprising a fluid-tight enclosure having an inlet and an outlet, a valve element supported for movement to respective positions to open and to close said outlet, and actuator means for moving said valve element from one of said positions to the other of said positions, said actuator means including a thermally responsive means for producing a mechanical displacement output, movable over-center mechanical energy storage means operatively connected to said valve element for moving said valve element from one to the other of said positions in response to such mechanical displacement output of said thermally responsive means, holder means for supporting said valve element, said energy storage means comprising a resilient member supported between said thermally responsive means and said holder means, said thermally responsive means including an arm movable relative to said holder means in response to a change in temperature of said thermally responsive means, said resilient member having first and second support points movable respectively with said arm and with said holder and thus having two different stable positions depending on the relative locations of said support points, and said resilient member tending in each of said stable positions to urge said support points and thus said arm and said holder means away from each other, whereby in one of said stable positions said resilient member urges said holder means and thus said valve element to a position to close said outlet and in the other one of said stable positions said resilient member urges said holder means and thus said valve element to a position to open said outlet, said resilient member comprising a C-spring, said C-spring having opposed arms, and coupling means at one end of said thermally responsive means for connecting one arm of said C-spring to said thermally responsive means, said coupling means including an electrical insulator having a notch, and said one arm of said C-spring including a bent portion facing said notch and being retained therein under the urging of pre-loaded mechanical energy in said C-spring.

2. A fluid valve, comprising a fluid-tight enclosure having an inlet and an outlet, a valve element supported for movement to respective positions to open and to close said outlet, and actuator means for moving said valve element from one of said positions to the other of said positions, said actuator means including a thermally responsive means for producing a mechanical displacement output, movable over-center mechanical energy storage means operatively connected to said valve element for moving said valve element from one to the other of said positions in response to such mechanical displacement output of said thermally responsive means, and heater means for heating said thermally responsive means, said thermally responsive means comprising a bimetal element, and extension means for coupling said thermally responsive means to said energy storage means, said extension means comprising a temperature compensator bimetal element.

3. A fluid valve, comprising a fluid-tight enclosure having an inlet and an outlet, a valve element supported for movement to respective positions to open and to close said outlet, and actuator means for moving said valve element from one said positions to the other of said positions, said actuator means including a thermally responsive means for producing a mechanical displacement output, movable over-center mechanical energy storage means operatively connected to said valve element for moving said valve element from one to the other of said positions in response to such mechanical displacement output of said thermally responsive means, and calibrating adjustment means for adjusting the valve to set the required magnitude of such mechanical displacement output to effect movement of said energy storage means to an over-center condition, said calibrating adjustment means comprising a movable valve seat in said outlet and against which said valve element seals when in closed position.

4. A fluid valve as set forth in claim 3, further comprising stop means for limiting the maximum travel of said valve element away from said valve seat to open said outlet, said stop means being adjustable with said valve seat to maintain constant the maximum separation between said valve seat and said valve element when the latter is in its open position.

5. A fluid valve as set forth in claim 3, further comprising deflectable holder means for supporting said valve element, said deflectable holder means having an opening, and said actuator means being positioned in alignment with said opening for movement into and out of the same to effect movement of said energy storage means to respective over-center conditions and thus to effect deflection of said deflectable holder means to move said valve element to said open and closed positions.

6. A fluid valve, comprising a fluid-tight enclosure having an inlet and an outlet, a valve element in said enclosure movable between respective positions to open and to close said outlet, said outlet including a movable valve seat adjustable from the exterior of said container to vary the normal closure force of said valve element against said valve seat to close said outlet, actuator means for moving said valve element to said respective positions, and stop means for limiting the maximum travel of said valve element away from said valve seat to such an open position, said stop means being operatively connected to said valve seat for movement therewith to maintain constant the maximum separation between said valve seat and said valve element when the latter is in its open position.

7. A fluid valve as set forth in claim 6, further comprising holder means for supporting said valve element normally in one of said positions, said holder means including means mounting said valve element for limited movement relative to said holder means, and resilient bias means for urging said valve element for limited movement relative to said holder means toward said outlet, such limited movement being less than the movement of said holder means by said actuator means to open said outlet.

8. A fluid valve as set forth in claim 6, wherein said stop means includes a first portion biased into engagement with said valve seat for movement therewith, and a second portion connected to said first portion in spaced relation therefrom defining a stop surface for limiting the maximum travel of said valve element away from said valve seat to such open position.

* * * * *